(12) United States Patent
Brevini et al.

(10) Patent No.: US 11,959,474 B2
(45) Date of Patent: Apr. 16, 2024

(54) AXIAL PISTON PUMP WITH INCLINED PLATE

(71) Applicant: MIXTRON S.R.L., Reggio Emilia (IT)

(72) Inventors: Stefano Brevini, Reggio Emilia (IT); Renato Brevini, Reggio Emilia (IT)

(73) Assignee: MIXTRON S.R.L., Reggio Emilia (IT)

( * ) Notice: Subject to any disclaimer, the term of this patent is extended or adjusted under 35 U.S.C. 154(b) by 0 days.

(21) Appl. No.: 17/784,976

(22) PCT Filed: Nov. 30, 2020

(86) PCT No.: PCT/IB2020/061259
§ 371 (c)(1),
(2) Date: Jun. 13, 2022

(87) PCT Pub. No.: WO2021/123976
PCT Pub. Date: Jun. 24, 2021

(65) Prior Publication Data
US 2023/0003214 A1   Jan. 5, 2023

(30) Foreign Application Priority Data

Dec. 17, 2019   (IT) .......................... 102019000024199

(51) Int. Cl.
*F04B 1/14* (2020.01)
*B23C 5/08* (2006.01)
(Continued)

(52) U.S. Cl.
CPC .............. *F04B 53/007* (2013.01); *B23C 5/08* (2013.01); *F04B 1/14* (2013.01); *F04B 1/143* (2013.01); *F04B 1/146* (2013.01)

(58) Field of Classification Search
CPC ................ F04B 1/14–188; F04B 53/16; F01B 3/0002–0029
See application file for complete search history.

(56) References Cited

U.S. PATENT DOCUMENTS 2,016,802 A * 10/1935 Fick .......................... F01B 3/02
91/507
2,392,543 A    1/1946 Merci Er
(Continued)

FOREIGN PATENT DOCUMENTS

DE                19524471 A1 *  1/1997  ................ B66F 3/46

*Primary Examiner* — Thomas Fink
(74) *Attorney, Agent, or Firm* — Browdy and Neimark, PLLC

(57) ABSTRACT

The present invention concerns an axial piston pump (1, 1', 1",1'") for the pumping of a liquid comprising: a head (20) in which there is at least partially made a plurality of cylinders (25) in a number greater than three, with central axes parallel between them, a plurality of pistons (75) each of which slide in a respective cylinder (25) of the plurality of cylinders (25) for the pumping of the liquid, and a suction channel of the liquid to pump, which is equipped with a primary duct (140) and a plurality of branch ducts (145, 145',145"), each of said branch ducts (145, 145',145") being adapted to place the primary duct (140) in fluid communication with a respective cylinder (25) of the plurality of cylinders (25), in which the primary duct (140) is positioned between the central axes of the cylinders (25).

9 Claims, 12 Drawing Sheets

(51) Int. Cl.
*F04B 1/143* (2020.01)
*F04B 1/146* (2020.01)
*F04B 53/00* (2006.01)

(56) References Cited

U.S. PATENT DOCUMENTS

| | | | | |
|---|---|---|---|---|
| 2,913,911 A * | 11/1959 | Gilkey | ............... | F16H 23/04 |
| | | | | 417/269 |
| 3,257,960 A * | 6/1966 | Keel | ............... | F04B 1/148 |
| | | | | 417/269 |
| 3,498,229 A | 3/1970 | Prelesnik | | |
| 3,954,048 A * | 5/1976 | Houser | ............... | F16J 15/44 |
| | | | | 417/269 |
| 4,431,378 A * | 2/1984 | Hattori | ............... | F04B 27/1036 |
| | | | | 417/269 |
| 4,838,765 A | 6/1989 | Wusthof et al. | | |
| 6,368,071 B1 | 4/2002 | Hashida et al. | | |
| 2012/0257993 A1* | 10/2012 | Ono | ............... | F04C 29/065 |
| | | | | 417/312 |

* cited by examiner

AXIAL PISTON PUMP WITH INCLINED PLATE

TECHNICAL FIELD

The present invention relates to an axial piston pump, in particular an axial piston pump with inclined plate for high pressures and usable with low viscosity fluids.

PRIOR ART

Axial piston pumps with inclined plate generally comprise a head in which there is at least partially a plurality of cylinders arranged in parallel to each other and in each of which a piston slides to pump a liquid. Said cylinders are connected to a liquid source to pump through a suction channel, usually comprising a primary duct and a plurality of branch ducts that place the primary duct in fluid communication with the cylinders.

Axial pumps with inclined plate for high pressures with three pistons are known, which on one hand are of relatively simple design and construction, particularly as regards the construction and design of the suction channels, and on the other hand have significant fluctuations in flow rate during operation.

An object of the present invention is to make available an axial piston pump with reduced delivery flow rate fluctuation which is at the same time of compact and efficient construction in fluid-dynamic terms, all within a rational and affordable solution. Such object is achieved by the features of the invention indicated in the independent claim. The dependent claims outline preferred and/or particularly advantageous aspects of the invention.

DISCLOSURE OF THE INVENTION

In particular, the invention makes available an axial piston pump for pumping liquid comprising:
- a head in which there is at least partially a plurality of cylinders in a number greater than three, with central parallel axes,
- a plurality of pistons that each slide within a respective cylinder of the plurality of cylinders for the pumping of the liquid,
- a suction channel of the liquid to pump, which is equipped with a primary duct and a plurality of branch ducts, each of said branch ducts being adapted to place the primary duct in fluid communication with a respective cylinder of the plurality of cylinders, in which the primary duct is positioned between the central axes of the cylinders.

This solution makes available an axial piston pump with reduced delivery flow rate fluctuation which is robust and compact and particularly efficient in fluid-dynamic terms.

According to an aspect of the invention, the suction channel may be made in the head.

In this way the axial compactness of the pump is improved and the assembly operations are made faster.

Preferably the suction channel may be made entirely in the head.

According to another aspect of the invention, the primary duct may be equidistant from all the cylinders.

In this way the uniform distribution of the liquid is guaranteed.

Another aspect of the invention envisages that the primary duct may be cylindrical.

According to yet another aspect of the invention, the branch ducts may each comprise a pair of walls, opposing each other, each one with respective curved surfaces each one having respectively a single transversal axis of curvature in relation to a plane perpendicular to the central axes of the cylinders.

With this solution, the branch ducts are simpler and cheaper to make compared to the prior art.

For example, the curved surfaces each comprise a concave portion facing the concave portion of the other curved surface.

A different aspect of the invention envisages that the branch ducts may have a circular cross-section.

The invention also makes available a method for the creation of a branch duct in an axial piston pump according to claim 1, comprising the steps of:
- providing a disc milling cutter,
- inserting the disc milling cutter in one between a cylinder and the primary duct along the direction of the respective axis, and
- move the disc milling cutter upwards between the cylinder or the primary duct transversally to the respective axis to create a branch duct which places the primary duct in fluid communication with a respective cylinder.

In this way the branch ducts are faster and cheaper to make.

BRIEF DESCRIPTION OF THE DRAWINGS

Further features and advantages of the invention will be more apparent after reading the following description provided by way of a non-limiting example, with the aid of the figures shown in the accompanying drawings.

BEST MODE OF THE INVENTION

Figure 1:
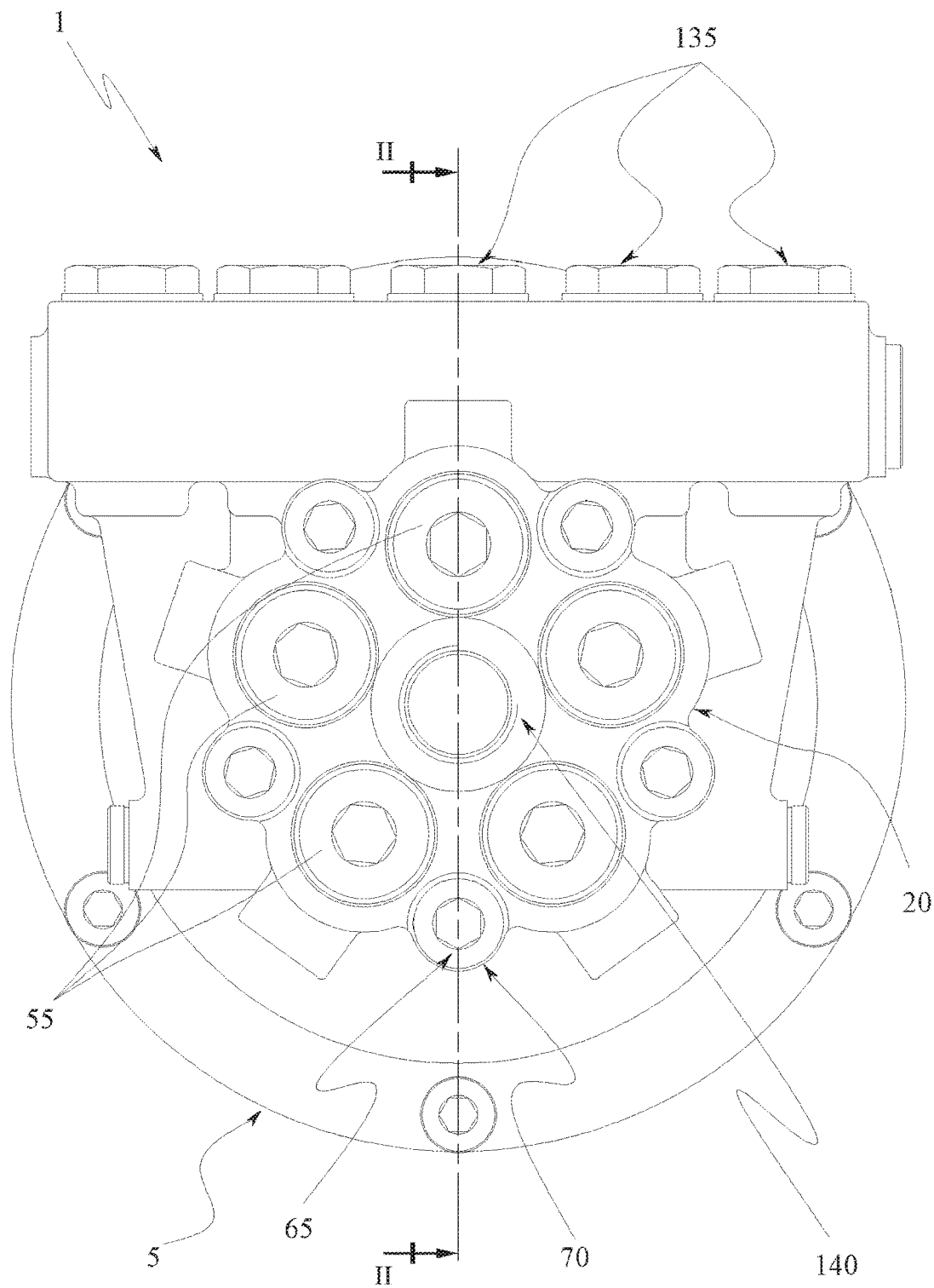
FIG. 1 is a front view of an axial piston pump according to the invention.
Figure 2:
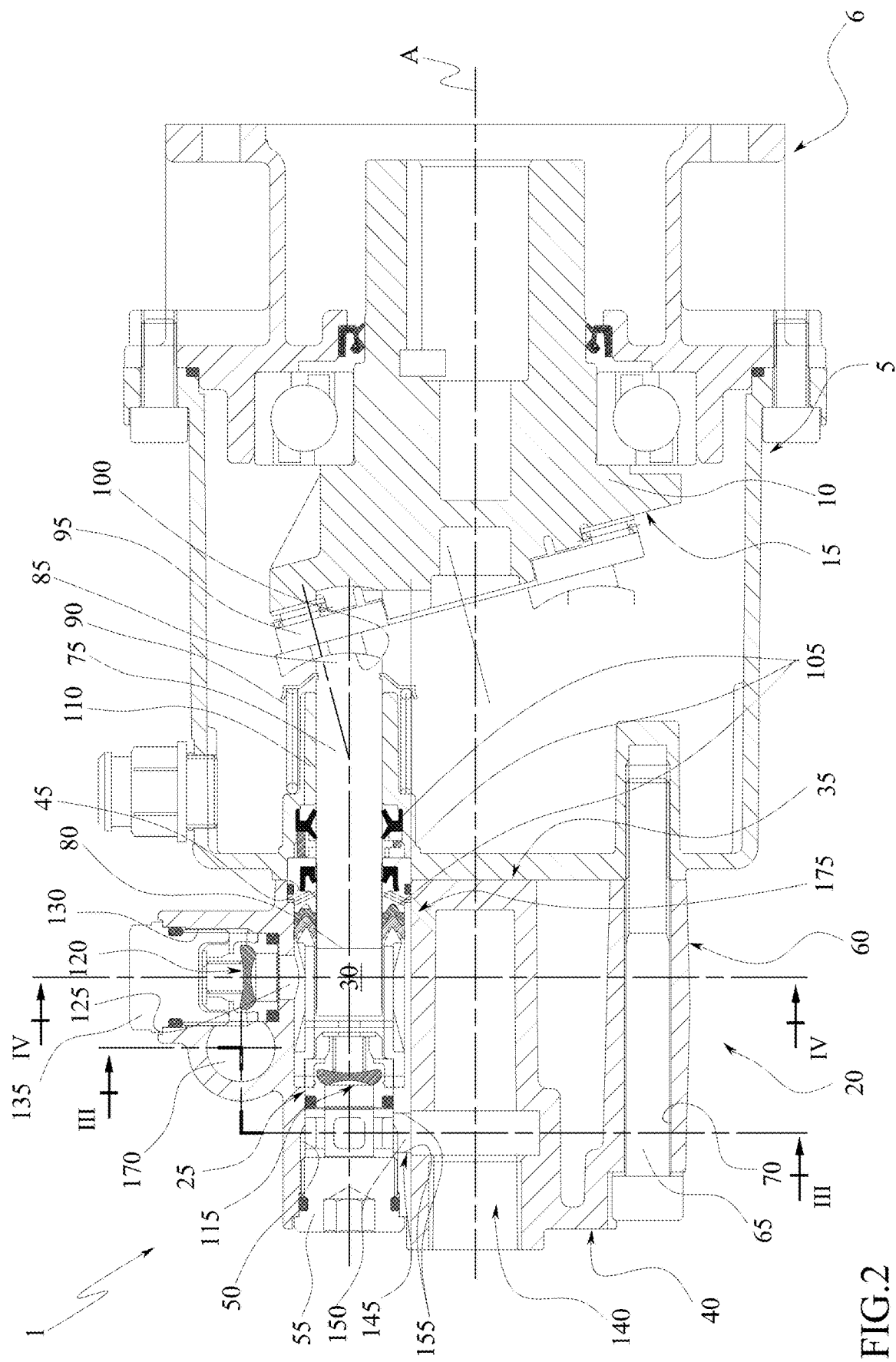
FIG. 2 is a section view of the axial piston pump in FIG. 1, taken along the plane II-II.
Figure 3:
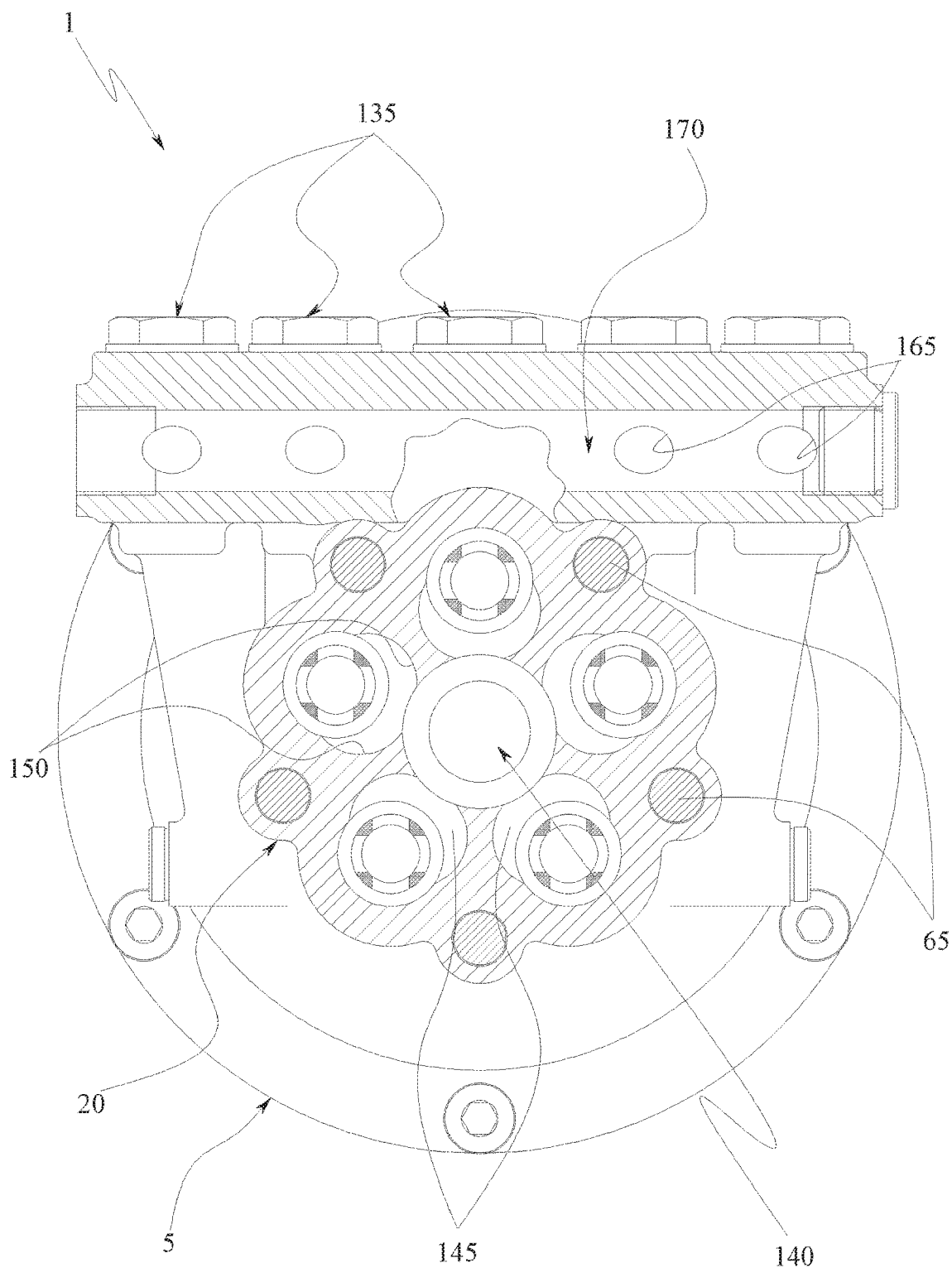
FIG. 3 is a section view according to the plane III-Ill of FIG. 2.
Figure 4:
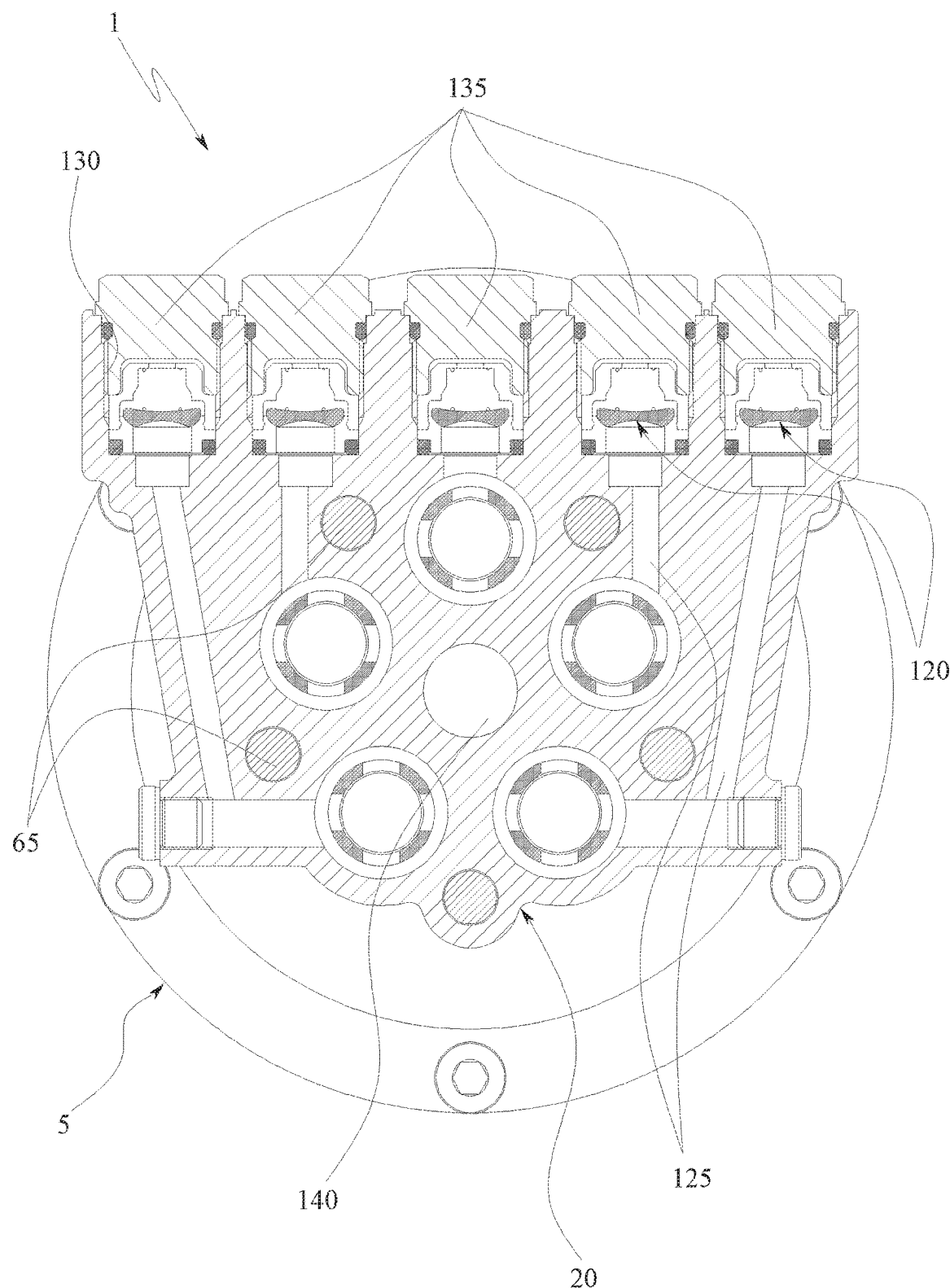
FIG. 4 is a section view according to the plane IV-IV of FIG. 2.
Figure 5:
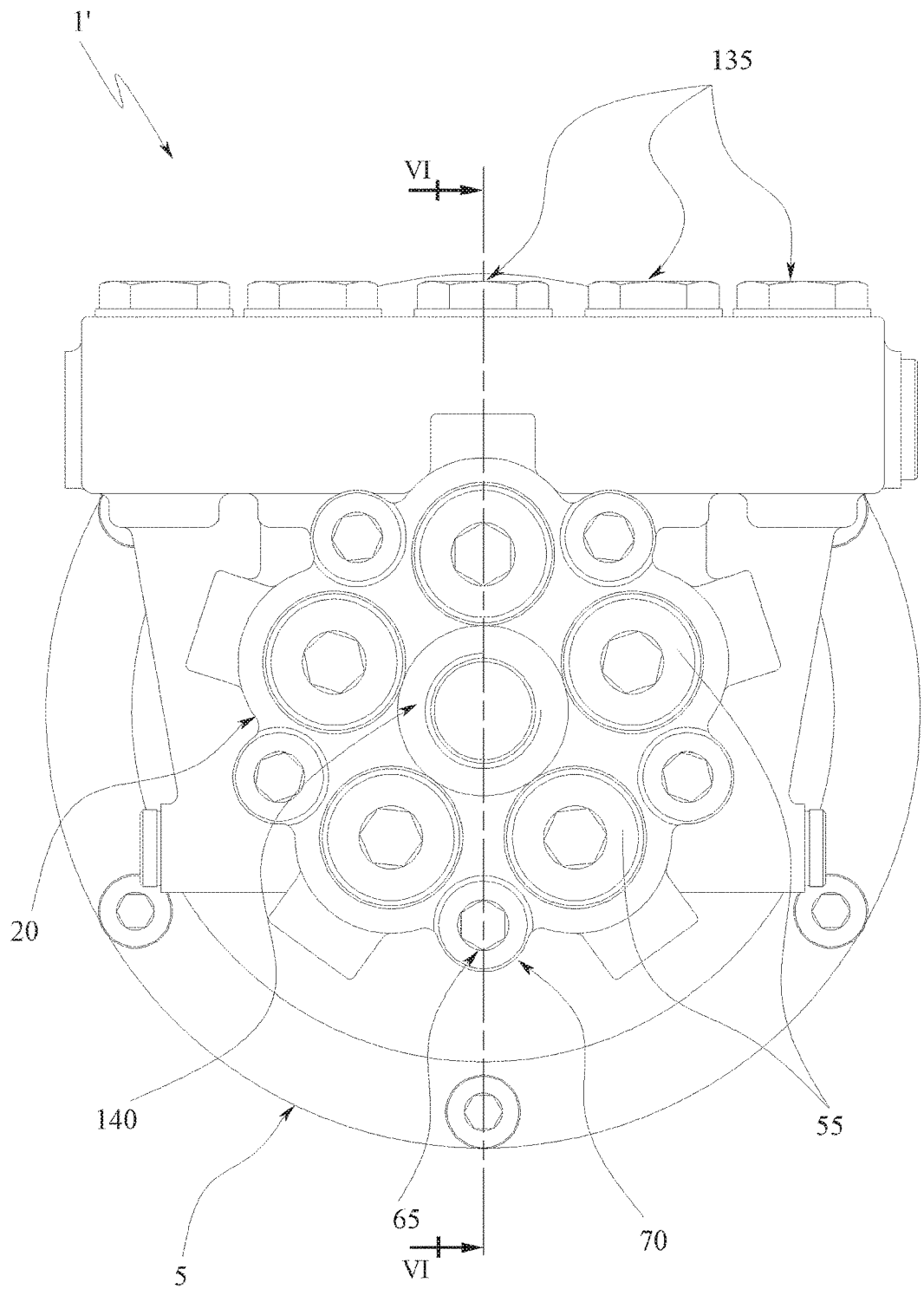
FIG. 5 is a front view of another embodiment of the axial piston pump according to the invention.
Figure 6:
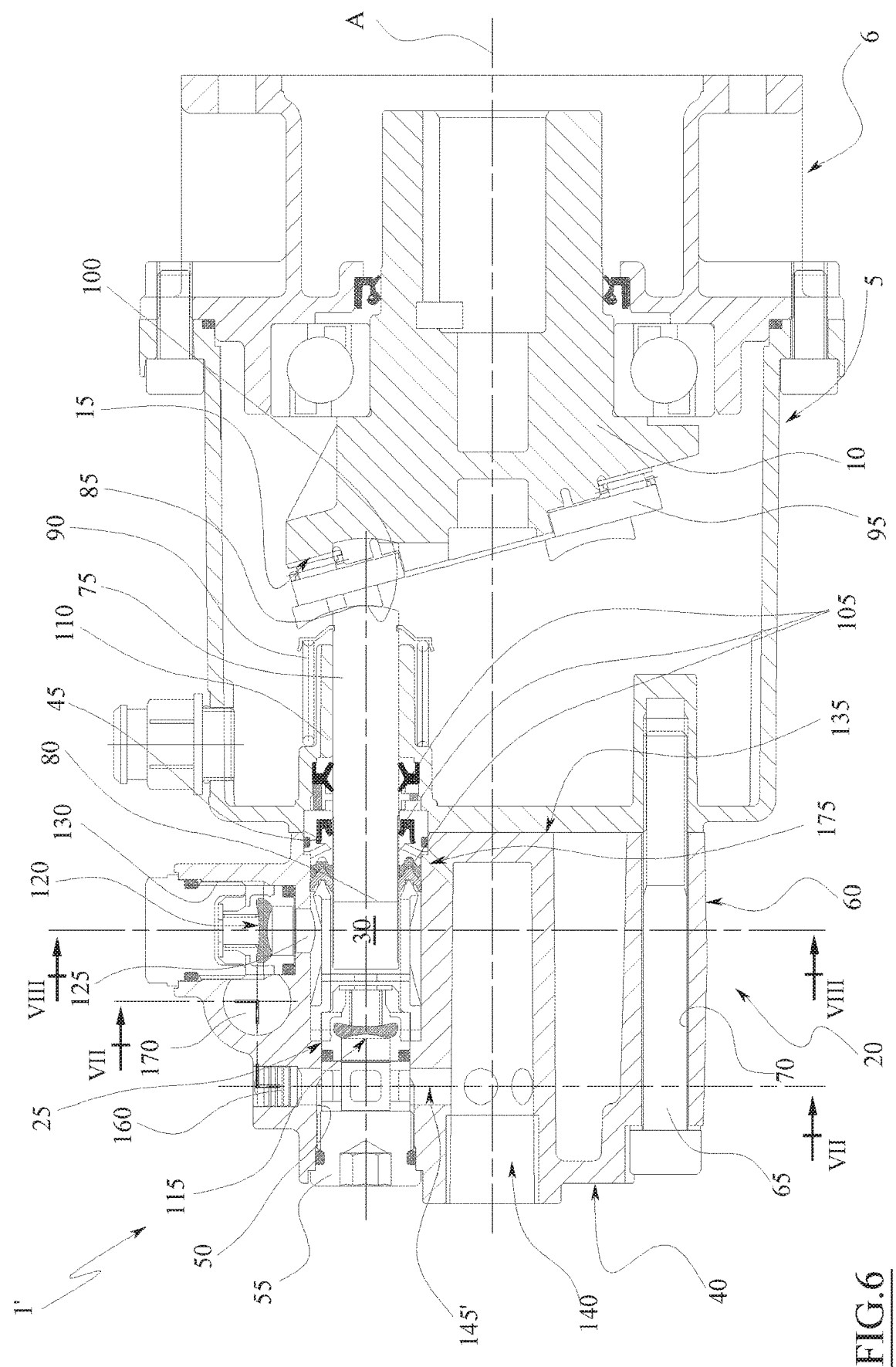
FIG. 6 is a section view of the axial piston pump in FIG. 5, taken along the plane VI-VI.
Figure 7:
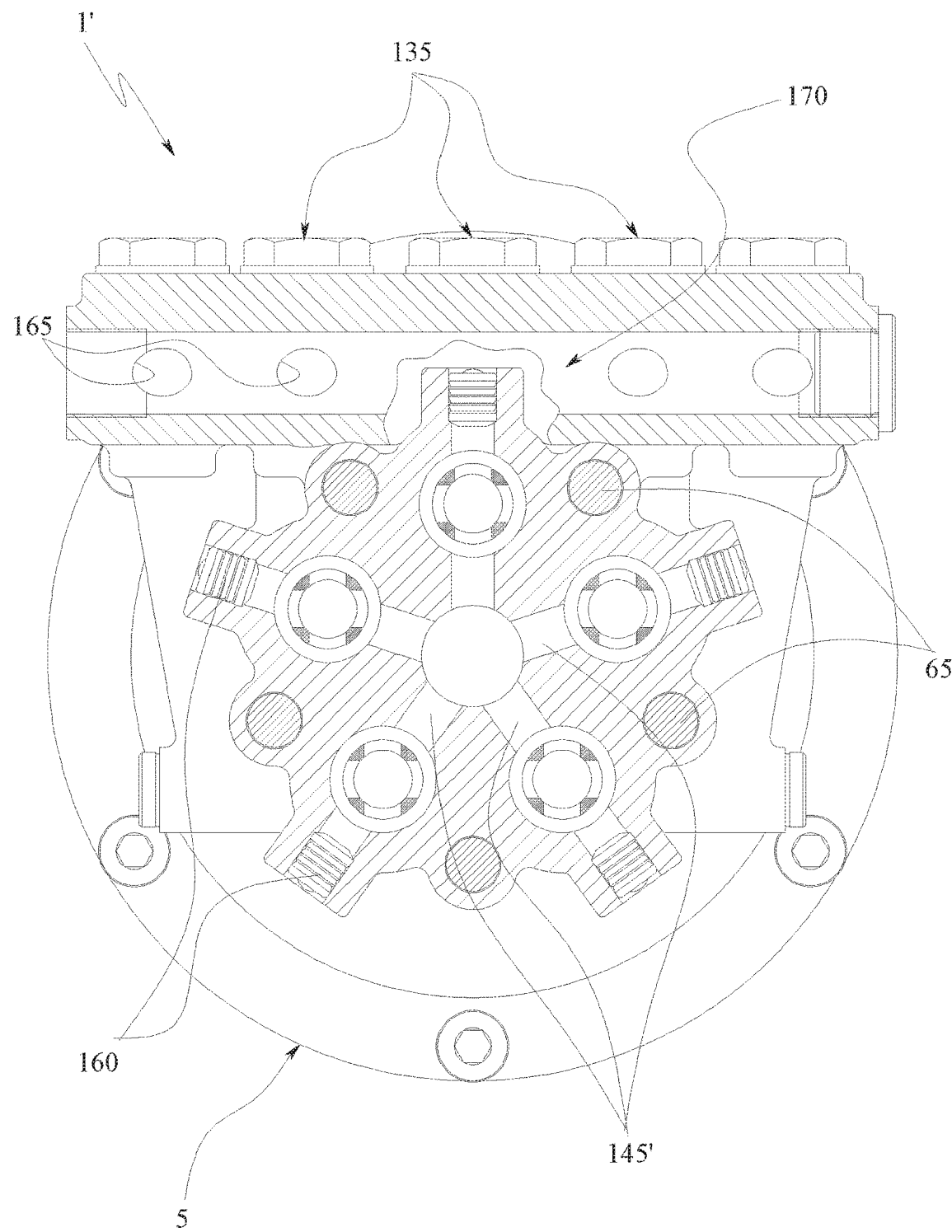
FIG. 7 is a section view according to the plane VII-VII of FIG. 6.
Figure 8:
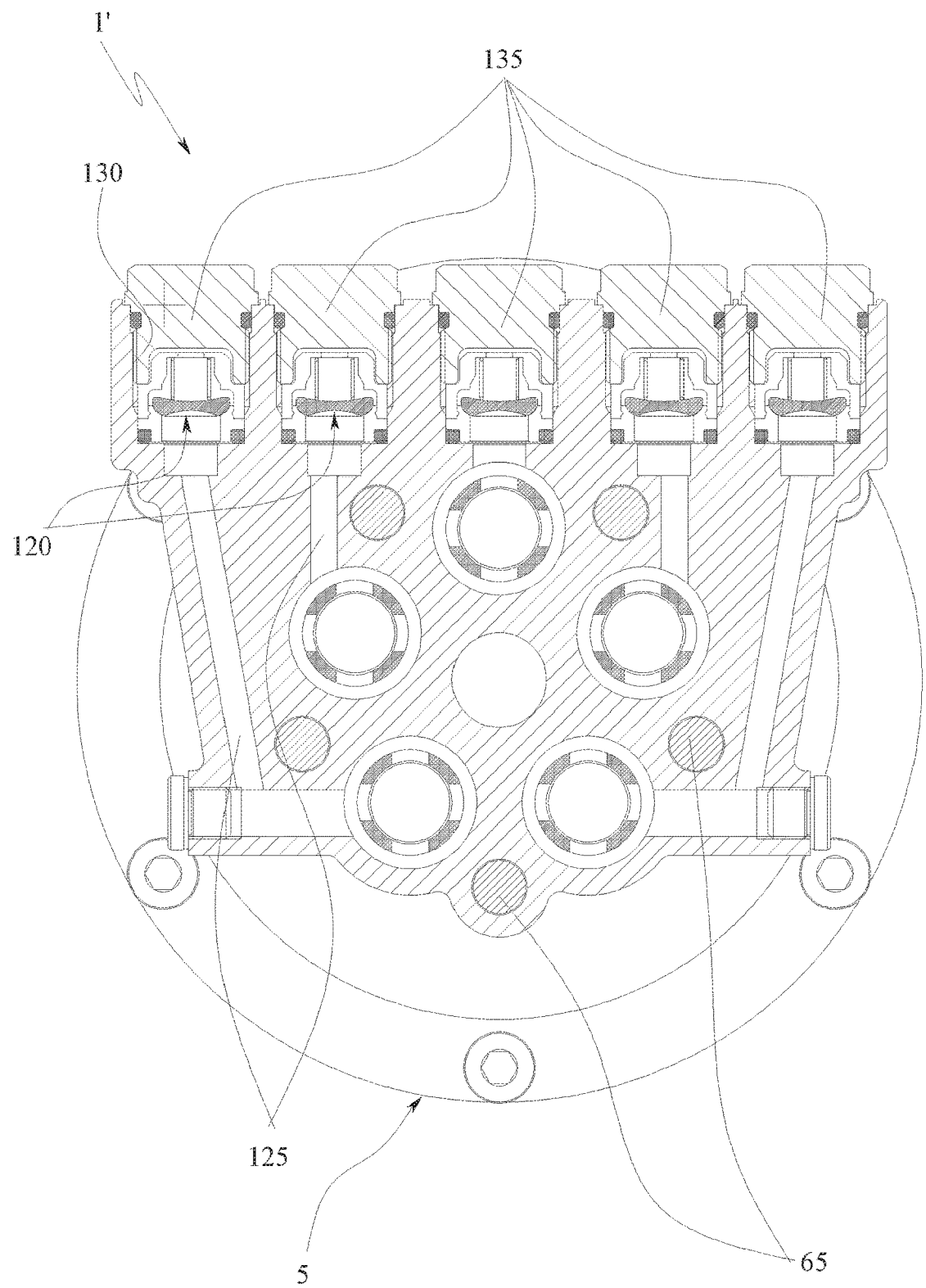
FIG. 8 is a section view according to the plane VIII-VIII of FIG. 6.

With particular reference to these figures, $1,1',1'',1'''$ indicates overall an axial piston pump for high pressures, preferably suited for pumping liquids with low viscosity, for example water.

For example, the axial piston pump 1,1',1",1"' is of the type fitted with a fixed inclination rotating plate, as better described below. Furthermore it is of the type fitted with automatic valves for controlling the pumping flow.

The axial piston pump 1,1',1",1"' may comprise a crankcase 5, a rotating inclined plate 10, adapted to receive a rotating motion from a crankshaft external to the axial piston pump 1,1',1",1"' and for example a fixing flange 6 fixed to a motor equipped with the said crankshaft.

The inclined plate 10 is housed in the crankcase 5, it is rotatably associated to it on a pivot axis A, and for example comprises a flat annular surface 15 lying on an inclined plane in relation to the pivot axis A. In particular, the inclined plate is rotatably associated by a bearing to the flange 6, which is bolted to the crankcase 5.

The axial piston pump 1,1',1",1"' comprises a head 20 fixed to the crankcase 5, or fixed without residual degrees of freedom to the crankcase 5, in which there is a plurality of cylinders 25, that is cylindrical holes, each one adapted to contain respective liquid pumping chambers 30.

The head 20 can be made in a unitary body, that can be obtained by processing a single body obtained from the solidification of a single cast or injection of material into a mould. The cylinders 25 of the plurality of cylinders 25 are more than three, that is at least four, preferably there are five, and are arranged with their respective central axes parallel to each other.

For example, the cylinders 25 are arranged radially along a common axis, in relation to which the central axes are parallel. Furthermore they are placed at an equal distance from each other and at the same distance to the common axis. In other words, the cylinders 25, that is the central axes of the cylinders 25, are arranged at equidistant angles to each other along an imaginary circumference centred on the common axis. In the shown embodiment, the common axis of the cylinders 25 is coaxial to a central axis of the head. For example, said common axis is also coaxial to the pivot axis A.

Again in the shown embodiment, in which there are five cylinders, the central axes of the cylinders pass through the vertices of an imaginary regular pentagon lying on a perpendicular plane to the central axes of the cylinders themselves.

Preferably the cylinders 25 are through cylinders, that is they cross the head 20 from one side to the other. In particular, the head may comprise a first face 35 proximal to the crankcase 5, for example flat, and an opposite second face 40 distal to the crankcase 5, for example flat, and the cylinders 25, that is the cylindrical holes, extend from the first face to the second face. Specifically, each cylinder 25 extends from the first face 35 to the second face 40 creating a first opening 45 in the first face 35 and a second opening 50 in the second face 40. The pump 1 may comprise a plurality of suction caps 55, one for each cylinder 25, which are configured to hermetically seal the second openings of the cylinders. The head 20 comprises a side surface 60 which extends from the first face to the second face, connecting them.

The first face 35 and the second face 40 may be parallel to each other, for example also transversal, preferably perpendicular, to the central axes of the cylinders 25. In the shown embodiment, the first face is at least partially in contact with the crankcase 5.

The cylinders 25 all have the same diameter.

The axial piston pump 1,1',1",1"' may comprise a plurality of tightening screws 65, for example in a number at least equal to the number of cylinders 25, configured to fix the head 20 to the crankcase 5 and which are inserted in as many through holes 70 made in the head 20.

For example, the through holes 70 are arranged at an angle and equidistant from each other along the imaginary circumference centred on the common axis of the cylinders 25. The axial piston pump 1,1',1",1"' comprises a plurality of pistons 75 each adapted to slide in a respective cylinder 25, driven by the inclined plate 10 to pump the fluid.

In particular, following the rotation of the inclined plate 10, the pistons 75 are made to slide along the central axes of the respective cylinders 25 between a top dead centre, in which the volume of the pumping chamber 30 is minimal, and a bottom dead centre, in which the volume of the pumping chamber is maximum.

In the shown embodiment, each piston 75 has a first axial end 80 which partially delimits the pumping chamber and an opposite second axial end 85 which protrudes from the cylinder inside the crankcase 5 and, via a respective elastic element 90, is held in contact with an annular guide 95 which rests on the flat annular surface 15 of the inclined plate 10, for example by interposition of an axial roller bearing.

Each elastic element 90 has a first end connected to the crankcase 5 and a second end connected to the piston 75, for example near the second end 85.

The second axial end 85 may be rounded and convex in shape. In this case the annular guide 95 has a concave annular surface 100 adapted to house the second axial end and allows relative sliding between the annular guide and the second axial end 85. In particular, the concave annular surface 100 defines a profile, in a section plane containing the pivot axis, with a radius of curvature of between 1.5 and 1.7 times the diameter of the piston 75, preferably 1.6 times.

The axial piston pump 1,1',1",1"' comprises a plurality of annular gaskets 105 adapted to embrace and seal a respective piston 75, for example these annular gaskets being some housed in the crankcase 5 and others in the head 20, to prevent the fluid communication between the pumping chambers 30 and the crankcase 5.

Furthermore, the axial piston pump 1,1' may comprise a plurality of guide cylinders 110, for example made in the crankcase 5, each one adapted to guide a respective piston 75 sliding along the central axis of the corresponding cylinder 25a, 25b, 25c, 25d, 25e.

These guide cylinders 110 are in communication with the respective first openings 45 in the head 20. In particular, the gaskets housed in the crankcase 5 are inserted in an annular cavity between the respective cylinder 25a, 25b, 25c, 25d, 25e and the corresponding guide cylinder 110.

The axial piston pump 1,1',1",1"' may comprise a axially hollow spacer so that the piston can slide inside it, which at one axial end is in contact with a bottom wall of the cylinder opposite the first face 35 and at the opposite end is in contact with the annular gaskets 105. The spacer also comprises radial openings used to allow the circulation of the suctioned and pumped liquid.

Furthermore, the pump 1,1',1",1"' may comprise a suction valve 115 and a delivery valve 120 for each cylinder 25, the valves of which are automatic and allow the definition of the flow direction from and to the pumping chamber 30. In particular the suction valve 115 allows the flow only to the pumping chamber 30 and the delivery valve 120 allows the flow only from the pumping chamber 30.

It is specified that automatic valve refers to a valve configured to open automatically allowing fluid communication, between two environments between which it is interposed, when a pre-set difference between the pressures in both environments divided by the valve itself is reached. Specifically, automatic valves do not exploit electromechanical operating mechanisms but only differences in pressure.

In the embodiments of the piston pump shown, the suction valves 115, are housed inside the cylinders 25, for example in an end portion of each cylinder 25 distal to the crankcase 5. The pumping chamber is therefore partially delimited by the cylinder 25 from the first axial end 80 of the piston and from the suction valve 115.

It is not excluded in an alternative embodiment that the suction valves may not be housed in the cylinders 25, but may be positioned in specific seats made in the head and in fluid communication with the cylinders through specific suction channels.

Again in the shown embodiments, the delivery valves 120 are housed in seats made in the head 20, which are in fluid communication with the respective cylinders 25 through corresponding delivery channels 125.

The seats of the delivery valves are shaped as hollows made in the head and equipped with an opening, through which the valve can be inserted and extracted, in the side surface.

Each delivery channel is at least partially defined by a side hole 130 which extends from a respective cylinder to the side surface 60 of the head 20, in which it creates said opening of the seat of the delivery valve which places it in communication with the external environment. These delivery channels lie preferably on a single plane, for example perpendicular to the central axes of the cylinders.

The openings in the delivery channels are all facing one direction, for example they may lie on a same plane.

The pump 1,1',1",1'" may comprise a plurality of delivery caps 135, one for each side hole 130, which are configured to hermetically close the openings of said side holes 130 which place them in communication with the external environment.

Each pumping chamber is therefore delimited by the cylinder 25, by the first axial end 80 of the piston 75, by the delivery valve 120, by the delivery channel 125 and by the suction valve 115.

The pump 1,1',1",1'" comprises a suction channel for the distribution of the liquid to be pumped to the cylinders 25. In particular, the suction channel is in direct fluid communication with a portion of the cylinders 25 upstream of the suction valve 115 in relation to the flow direction of the fluid when the pump is in use.

The suction channel of the liquid to pump comprises a primary duct 140, which preferably runs along a longitudinal axis.

The primary duct 140 is located between the central axes of the cylinders 25, that is it is contained in a space between all the central axes of the cylinders 25. In even more detail, the primary duct 140 is contained in a space between the central axes of each pair of cylinders 25 of the plurality of cylinders 25 diagonally opposite to the common axis.

Furthermore, the primary duct 140 is located in an intermediate position in relation to all the central axes of the cylinders 25 of the plurality of cylinders 25. For example the primary duct 140 is equidistant from all the central axes of the cylinders 25, that is the longitudinal axis of the primary duct 140 is equidistant from all the central axes of the cylinders 25.

The longitudinal axis of the primary duct 140 is for example parallel to the central axes of the cylinders 25, preferably also coaxial to the common axis of the cylinders 25.

In the shown embodiment, the primary duct 140 is interposed between the cylinders 25, that is it is contained in a space between all the cylinders 25. Or again, it is located in a position interposed between each pair of cylinders 25 of the plurality of cylinders 25.

The primary duct 140 is preferably made in the head 20.

Furthermore, the primary duct 140 is preferably of a cylindrical shape. However it is not excluded in an alternative embodiment for it to be conical in shape.

For example, the primary duct 140 may substantially be shaped as a blind hole running along its own longitudinal axis from the second face 40 of the head 20 towards the inside of the head 20.

The suction channel also comprises a plurality of branch ducts 145, 145',145" one for each cylinder 25, which are configured to place the primary duct 140 in fluid communication with the cylinders 25, in particular with the portion of the cylinders 25 upstream of the suction valve 115 in relation to the fluid flow direction when the pump is in use.

For example the branch ducts 145, 145',145" are also made in the head 20.

Figure 12:
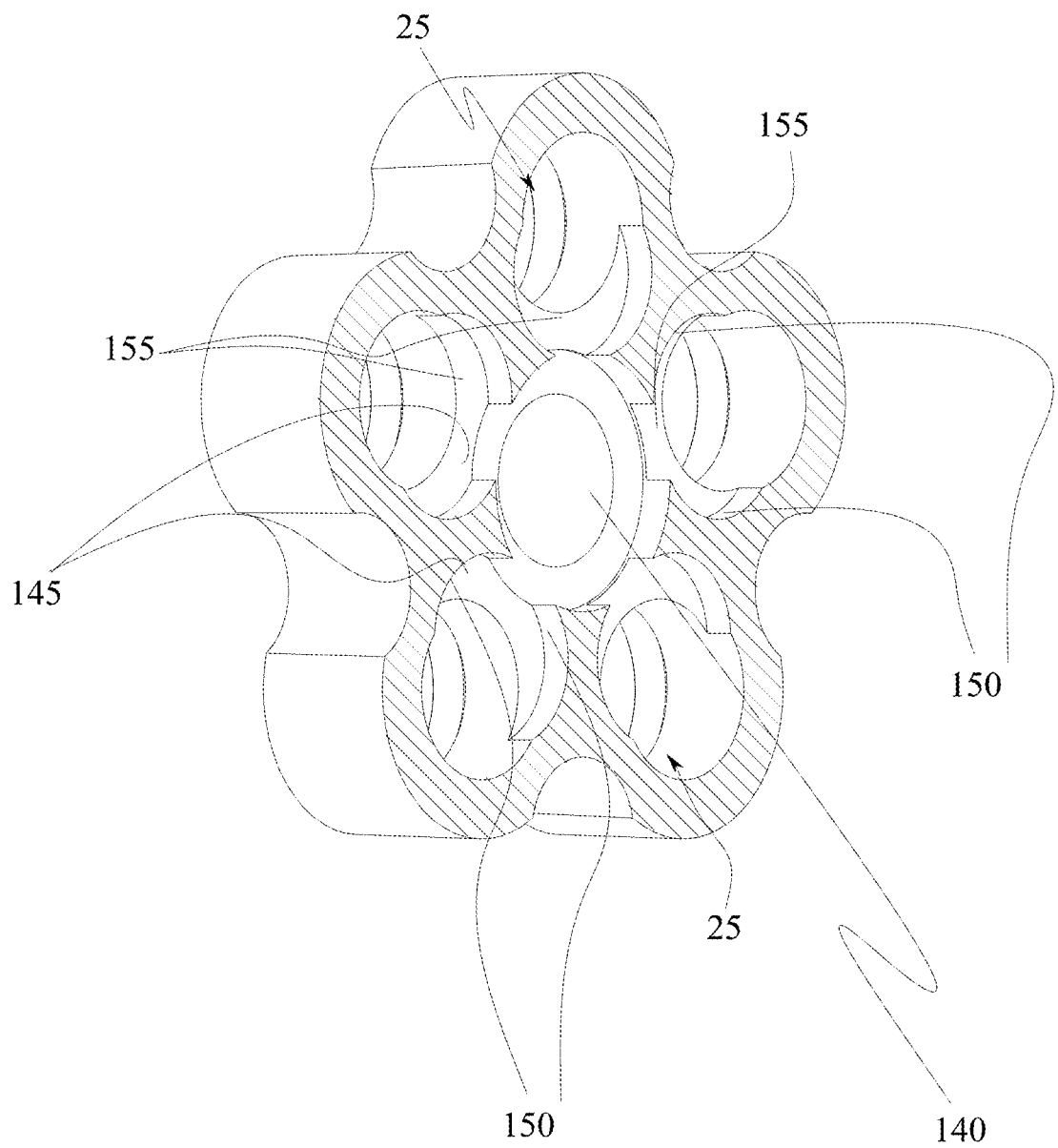
FIG. 12 is a perspective schematic view of a part of the axial pump according to one embodiment.

In the embodiments of the piston pump shown in FIGS. 1-4, as shown in FIG. 12, the branch ducts 145 each have a pair of side walls 150, which are opposite each other, that is facing each other, each one comprising at least a curved surface with a single axis of curvature, the said axis of curvature being transversal to a plane perpendicular to the central axes of the cylinders 25, preferably it is parallel to the central axes of the cylinders 25.

For example, the curved surfaces define respective concave portions facing each other. Furthermore, the curved surfaces of the side walls of each branch duct 145 are symmetrical to an axis of symmetry containing the central axis of the respective cylinder 25.

The side walls may also comprise more than one curved surface, each of which has a single axis of curvature as described above.

In the shown embodiment in FIGS. 1-4, the pair of curved surfaces extends from the primary duct 140 to the respective cylinder 25, that is the curved surfaces wholly define the respective side walls 150.

As shown in FIG. 12, each branch duct 145 may also comprise an additional pair of side walls 155, preferably flat and opposite each other. Each wall of the additional pair of side walls is configured to extend from a side wall 150 to the opposite side wall 150.

For example the side walls 155 of the additional pair of side walls 155 each lie on a transversal plane in relation to the central axes of the cylinders 25, preferably perpendicular to the central axes of the cylinders 25.

The pair of side walls 150 and the additional pair of side walls 155 form the respective branch duct 145.

In the embodiments of the pump 1',1",1'" shown in FIGS. 5-10, the branch ducts 145' have a circular cross-section in relation to their longitudinal axis, that is they are shaped as cylindrical ducts.

In the embodiment of the pump 1',1" shown in FIGS. 5-9, the branch ducts 145' are at least partially defined by holes which extend from the primary duct 140 to the side surface 60 of the head 20. These holes are closed, at the openings defined by the holes themselves in the side surface 60 of the head 20, by suitable caps 160.

Preferably these holes extend along respective longitudinal axes perpendicular to the central axes of the corresponding cylinders 25.

Figure 10:
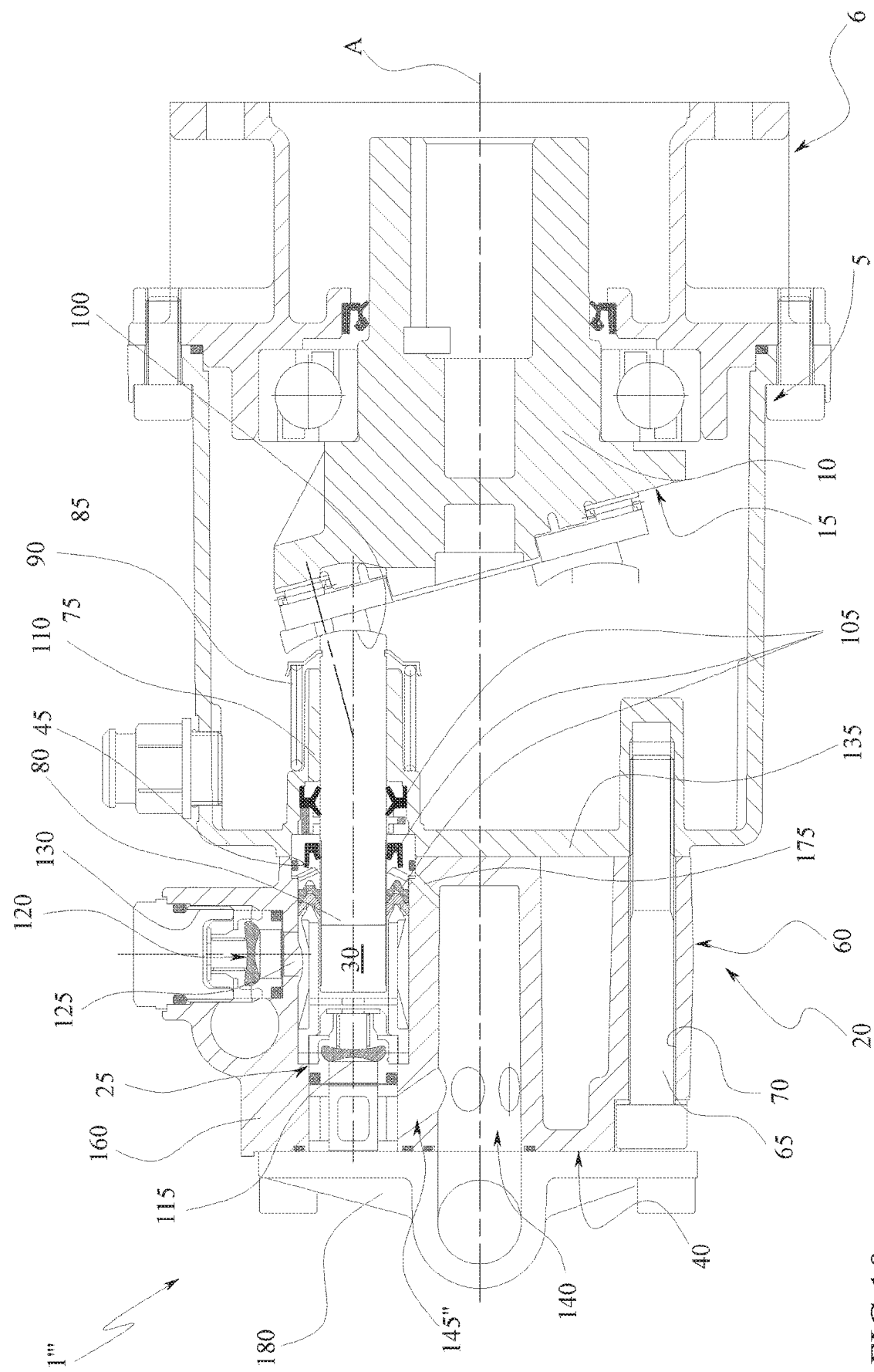
FIG. 10 is a section view of another embodiment of the axial piston pump according to the invention.
Figure 11:
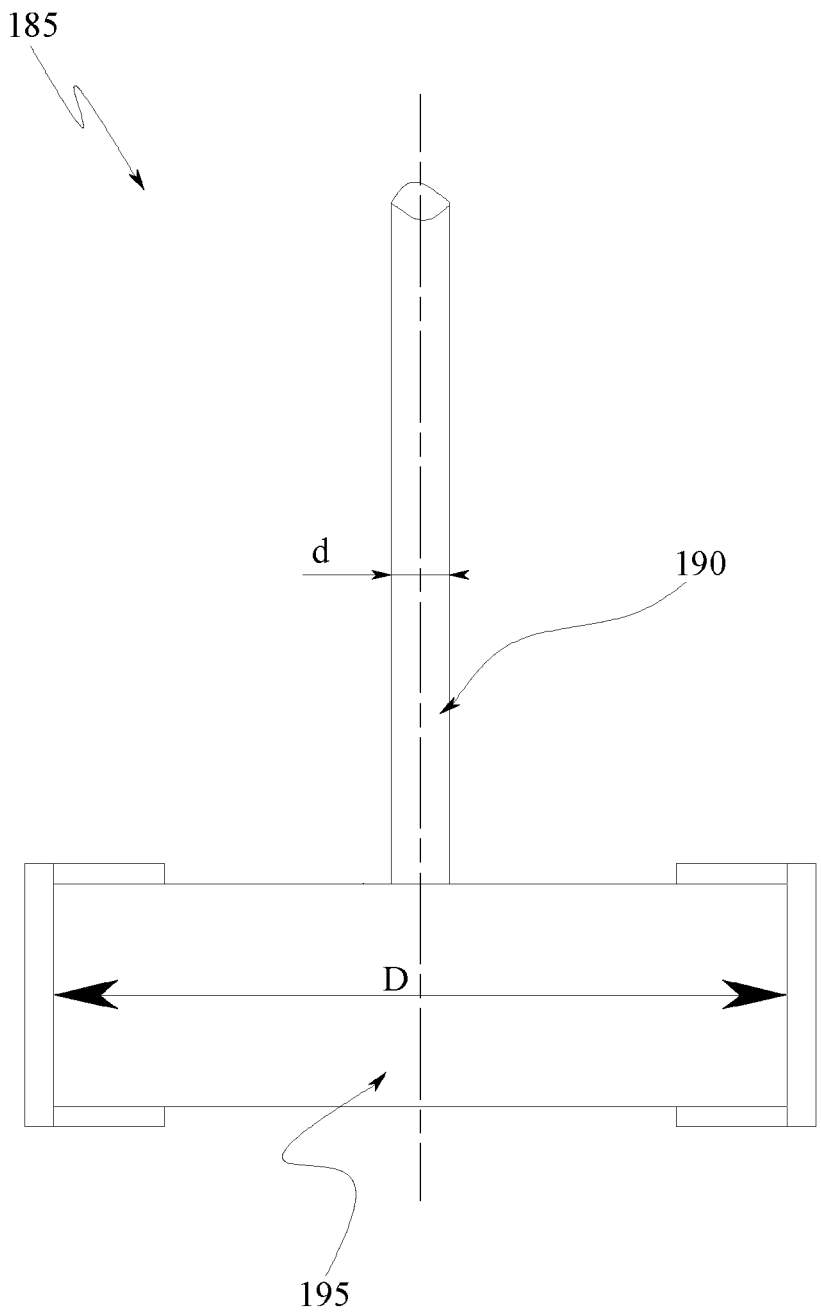
FIG. 11 is a partial and schematic side view of a disc milling cutter used in a method for the creation of a branch duct in an axial piston pump according to the embodiment shown in FIGS. 1-4.

In the embodiment of the pump 1'" shown in FIG. 10, the branch ducts 145" are defined by holes which extend (only)

from the primary ducts 140 to the respective cylinder 25, arranged with inclined longitudinal axis in relation to the central axis of the respective cylinder 25, that is with inclined longitudinal axis in relation to the longitudinal axis of the primary duct 140.

In particular the inclination is such that each duct 145" approaches a rotating plate going from the cylinder 25 to the primary duct 140.

In all embodiments shown, the pump 1,1',1" comprises a delivery channel for collecting the pumped liquid, which is in direct fluid communication with the delivery valves 120, and is placed downstream to it in relation to the fluid direction when the pump is in use.

In particular the delivery channel comprises a collection channel 165 for each delivery valve 120 and a main channel 170 in which all the collection channels 165 flow.

It is specified that the collection channels 165 are in fluid communication with the delivery channels 125 only through the delivery valves 120.

The pump 1 may also comprise return ducts 175, which place the cylinders 25 in fluid communication with the primary duct 140 independently from the branch duct 145. Each return duct 175 flows into a portion of the respective cylinder axially positioned between a pair of annular seal gaskets 105. This axial portion is placed near the crankcase 5.

In this way it is possible to directly take the liquid under pressure leaking from the annular gaskets present in the cylinder directly to the suction channel.

Figure 9:
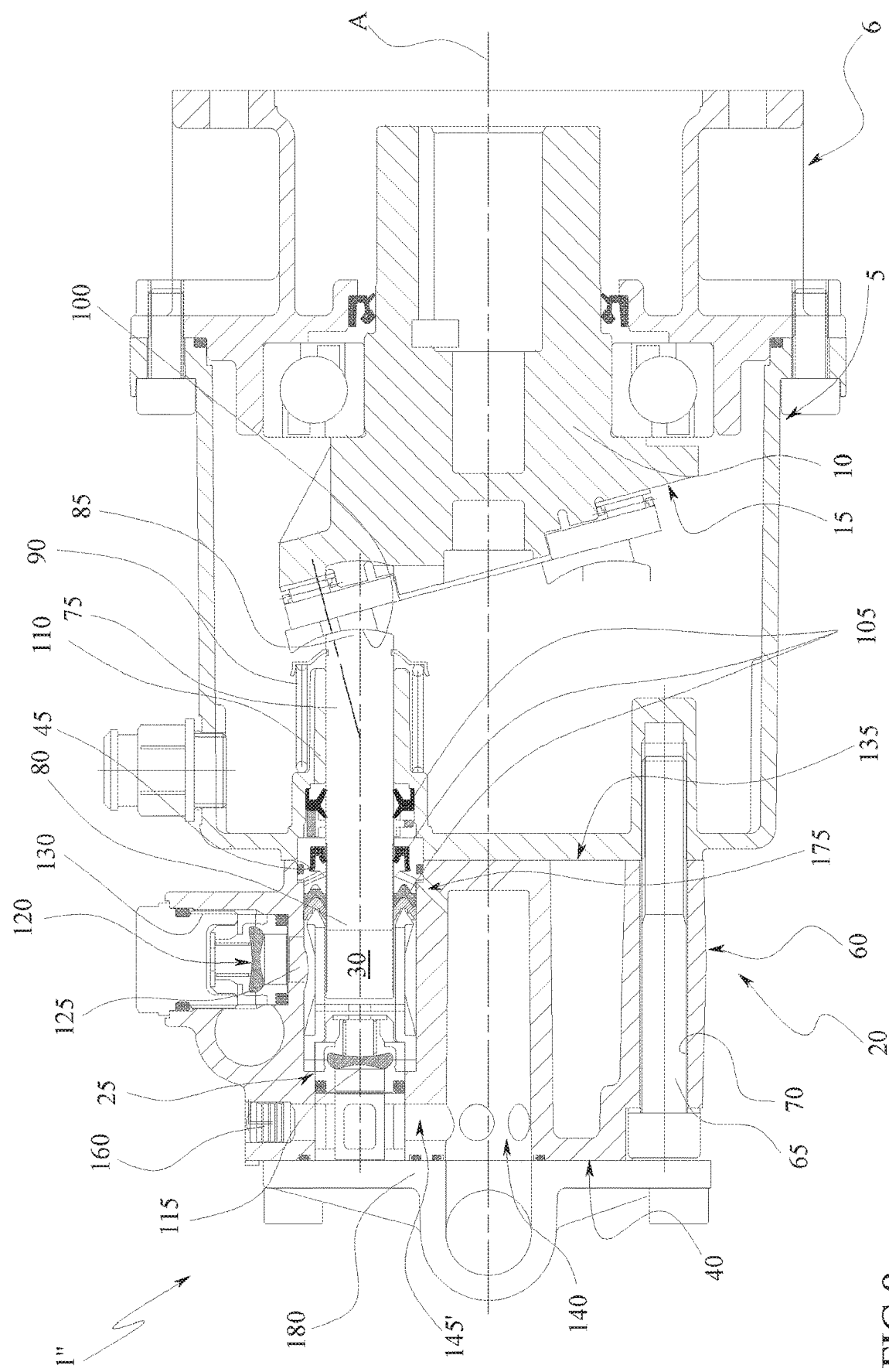
FIG. 9 is a section view of another embodiment of the axial piston pump according to the invention.

In two embodiments of the pump 1" and 1'" shown respectively in FIG. 9 and in FIG. 10, the pump does not comprise a plurality of caps adapted to close the openings of the cylinders 25 made in the second face 40 of the head 20. In these embodiments, the pump comprises a single cover 180, which closes all the openings of the cylinders 25 in the second face 40 and is in a removable manner associated, for example using threaded connection parts, to the head 20. The cover 180 may comprise a channel for the connection of an external pipe to the primary duct 140.

In the shown embodiment in FIG. 9 the branch ducts 145' are shaped as in the embodiment shown in FIGS. 5-8, where branch ducts 145' have a circular cross-section. However in an embodiment not shown, the branch ducts may be shaped as shown in the embodiment in FIGS. 1-4.

A method for the creation of a branch duct 145 in the axial piston pump 1 according to an embodiment shown in FIGS. 1-4, is the following.

The method envisages the step of providing a disc milling cutter 185, that is a disc milling cutter equipped with a shaft 190, adapted to allow the connection to a device able to transmit a rotational motion to the shaft, and a disc-shaped body 195 equipped with teeth to remove material and rotationally integral with the shaft (without residual degrees of freedom). In particular, the disc-shaped body 195 is fixed to the shaft so that a central axis, that is an axis of symmetry, of the disc-shaped body is coaxial to a central axis of the shaft 190, in relation to which the shaft is placed in rotation.

The disc milling cutter is preferably of the three-cut type, that is it is able to remove material along a side cylindrical portion and along a pair of opposite faces which delimit the top and bottom of the cylindrical side portion.

The disc-shaped body 195 has a radius greater than its height.

The shaft 190 is preferably shapes as a cylindrical body, in this case of an elongated shape, that is with a height greater than the radius.

The disc-shaped body has a diameter D which is greater than a diameter d of the shaft, for example the diameter D of the disc-shaped body is such that the disc-shaped body protrudes in relation to the shaft along a radial direction in an amount greater than half the minima distance between the primary duct 140 and a cylinder 25, measured along a plane perpendicular to the central axis of the cylinder.

Furthermore, the diameter D is less than the diameter of at least one of either a diameter of the cylinder 25 or a diameter of the primary duct 140.

That is, the diameter D is such to allow insertion with clearance, that is without interference causing the removal of material, of the disc milling cutter 185 in at least one of either a cylinder 25 and the primary duct 140. In particular the insertion allows is that along the central axis of the cylinder or the longitudinal axis of the primary duct.

The method then envisages inserting the disc milling cutter in either a cylinder or the primary duct, for example axially, that is along the longitudinal axis of the primary duct 140 or the central axis of the cylinder 25.

Before this step, the cylinders and/or the primary duct may have been previously made by casting or by the removal of material from a block of material.

After the step inserting the disc milling cutter 185, the method envisages the step of stopping the insertion of the disc milling cutter 185 at a shorter distance from the second face 40 of the head 20 than the distance from the second face 40 of the suction valve 115. This step also envisages maintaining the milling cutter as it was inserted.

Thereafter, the method envisages the step of moving the disc milling cutter, that is moving the disc milling cutter 185, along a path, for example rectilinear, towards either the cylinder 25 or the primary duct 140 transversally, for example perpendicular, to the respective axis to create a branch duct which places the primary duct in fluid communication with a respective cylinder.

In particular this step envisages moving the disc milling cutter 185 towards the cylinder 25 if the step of inserting the disc milling cutter was done in the primary duct 140, or moving the disc milling cutter 185 towards the primary duct 140 if the step of inserting the disc milling cutter was done in a cylinder 25.

Preferably the movement runs along a plane perpendicular to the axes of the cylinders 25.

Furthermore, this step is done by rotating the shaft 190 of the disc milling cutter 185 to remove material from the head 20.

Furthermore the disc milling cutter 185 is moved along the path for a distance of at least half the minimum distance between the primary duct 140 and a cylinder 25.

This step may envisage stopping the rotation of the shaft 190.

The method then envisages the step of moving the disc milling cutter 185 along said path towards the cylinder 25 or the primary duct 140 in which the step of inserting the disc milling cutter 185 was done, and subsequently extracting the disc milling cutter 185 axially from the head 20.

For the creation of all the branch ducts, the present method must be repeated as many times as there are cylinders 25.

The invention also makes available a method for the creation of a branch duct 145" in the axial piston pump 1'" according to the embodiment shown in FIG. 10.

This method envisages:
  providing a drill equipped with a bit which runs along a
    longitudinal plane, positioning at least a portion of the drill bit inside a cylinder 25 of the plurality of cylinders 25 with the longitudinal axis of the drill bit inclined in relation to the central axis of the cylinder 25, moving the drill bit from the cylinder 25 in which it was previously inserted towards the primary duct 140 to create a branch duct 145″ which places the primary duct 140 in fluid communication with a respective cylinder 25, In particular, the step of moving the drill bit takes place on an inclined plane in relation to the central axis of the cylinder, such plane is defined by the orientation of the longitudinal axis of the drill bit in the step of position at least a portion of the drill bit inside a cylinder. Furthermore, the step of positioning at least a portion of the drill bit inside a cylinder 25 envisages the insertion of said bit in the opening made in the second face of the head 20 by the respective cylinder.

Additionally, the step of providing the drill envisages the providing of a drill equipped with a but with a diameter of between 0.1 and 0.4 times the diameter of the cylinder 25.

The operation of the pump described above is as follows.

After the movement of the inclined rotating plate, in one or more cylinders at the same time, the movement of the respective piston towards a bottom dead centre generates a vacuum inside the pumping chamber, which in turn causes the respective delivery valve to close and the respective suction valve to open. Consequently, liquid is suctioned from the primary duct 140 and through the corresponding branch duct 145 reaches the corresponding pumping chamber 30 through the respective suction valve. Having reached the bottom dead centre, the piston rises towards the top dead centre following the thrust of the rotating plate, generating an overpressure in the pumping chamber which closes the suction valve and opens the delivery valve. The fluid therefore flows through the delivery valve into the respective collection channel of the valve and subsequently into the main duct 170 of the delivery channel.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. An axial piston pump of the inclined plate type for pumping liquid comprising:
    a head in which there is at least partially a plurality of cylinders in a number greater than three, with central parallel axes,
    a plurality of pistons that each slide within a respective cylinder of the plurality of cylinders for the pumping of the liquid,
    a suction channel of the liquid to pump, which comprises a primary duct and a plurality of branch ducts, each of said branch ducts being adapted to place the primary duct in fluid communication with a respective cylinder of the plurality of cylinders,
    in which the primary duct is positioned between central axes of the cylinders,
    wherein the branch ducts each comprise:
        a pair of walls, opposing each other and each having a respective curved surface with a single transversal axis of curvature in relation to a plane perpendicular to the central axes of the cylinders, and
        an additional pair of side walls, which are flat and opposed to each other, wherein each of said additional side walls extends from a wall of the pair of walls to the opposite wall of the pair of walls.

2. The axial piston pump according to claim 1, in which the suction channel is made in the head.

3. The axial piston pump according to claim 1, in which the primary duct is equidistant from all the cylinders.

4. The axial piston pump according to claim 1, in which the primary duct is cylindrical.

5. The axial piston pump according to claim 1, in which the curved surface of each wall of the pair of walls each comprise a concave portion facing the concave portion of the other curved surface of the opposite wall of the pair of walls.

6. The axial piston pump according to claim 1, in which the branch ducts have a circular cross-section.

7. The axial piston pump according to claim 6, in which the branch ducts extend along an inclined longitudinal axis in relation to the central axis of the respective cylinder.

8. A method for the creation of a branch duct in an axial piston pump according to claim 1, comprising the steps of:
    providing a disc milling cutter,
    inserting the disc milling cutter in one between a cylinder and the primary duct along the direction of the respective axis, and
    move the disc milling cutter upwards between the cylinder or the primary duct transversally to the respective axis to create a branch duct which places the primary duct in fluid communication with a respective cylinder.

9. The method for the creation of a branch duct in an axial piston pump according to claim 8, comprising the steps of:
    providing a drill equipped with a bit which runs along a longitudinal plane,
    positioning at least a portion of the drill bit inside a cylinder of the plurality of cylinders with the longitudinal axis of the drill bit inclined in relation to the central axis of the cylinder,
    moving the drill bit from the cylinder in which it was previously inserted towards the primary duct to create a branch duct which places the primary duct in fluid communication with a respective cylinder, in which the step of moving the drill bit takes place on an inclined plane in relation to the central axis of the cylinder, such plane is defined by the orientation of the longitudinal axis of the drill bit in the step of position at least a portion of the drill bit inside a cylinder.

\* \* \* \* \*